(12) United States Patent
Shi et al.

(10) Patent No.: US 12,002,213 B2
(45) Date of Patent: Jun. 4, 2024

(54) METHOD AND DEVICE FOR PERFORMING PLANE DETECTION

(71) Applicant: Samsung Electronics Co., Ltd., Suwon-si (KR)

(72) Inventors: Jun Shi, Beijing (CN); Lei Cao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 17/488,886

(22) Filed: Sep. 29, 2021

(65) Prior Publication Data

US 2022/0101532 A1    Mar. 31, 2022

Related U.S. Application Data

(63) Continuation of application No. PCT/KR2021/013270, filed on Sep. 28, 2021.

(30) Foreign Application Priority Data

Sep. 29, 2020   (CN) ............................ 202011049074
Nov. 20, 2020   (CN) ............................ 202011310759
Apr. 15, 2021   (KR) ........................ 10-2021-0049086

(51) Int. Cl.
  *G06T 7/11*    (2017.01)
  *G06T 7/50*    (2017.01)

(52) U.S. Cl.
  CPC .................. *G06T 7/11* (2017.01); *G06T 7/50* (2017.01); *G06T 2207/20084* (2013.01); *G06T 2207/20221* (2013.01)

(58) Field of Classification Search
  CPC ... G06T 7/11; G06T 7/50; G06T 2207/20084; G06T 2207/20221
  See application file for complete search history.

(56) References Cited

U.S. PATENT DOCUMENTS

| | | | |
|---|---|---|---|
| 2012/0250978 A1* | 10/2012 | Taylor | G06T 7/292 382/154 |
| 2016/0381387 A1* | 12/2016 | Domanski | H04N 19/597 375/240.08 |
| 2017/0228940 A1 | 8/2017 | Kutliroff | |
| 2019/0057532 A1 | 2/2019 | Marzban et al. | |
| 2020/0167943 A1* | 5/2020 | Kim | G06T 7/579 |
| 2020/0175700 A1* | 6/2020 | Zhang | G06V 10/26 |
| 2020/0175759 A1 | 6/2020 | Russell et al. | |
| 2020/0394759 A1* | 12/2020 | Luo | G06T 7/85 |

FOREIGN PATENT DOCUMENTS

| | | |
|---|---|---|
| WO | 2020/091096 A1 | 5/2020 |
| WO | 2020/152437 A1 | 7/2020 |

OTHER PUBLICATIONS

International Search Report dated Jan. 10, 2022, issued in International Application No. PCT/KR2021/013270.

* cited by examiner

*Primary Examiner* — Syed Haider
(74) *Attorney, Agent, or Firm* — Jefferson IP Law, LLP

(57) ABSTRACT

A method and a device for performing plane detection are provided. The method includes acquiring an input image, extracting features of the input image using a deep neural network and estimating a depth map of the input image based on the extracted features, performing region segmentation using the depth map to detect plane regions in the input image.

19 Claims, 13 Drawing Sheets

METHOD AND DEVICE FOR PERFORMING PLANE DETECTION

CROSS-REFERENCE TO RELATED APPLICATION(S)

This application is a continuation application, claiming priority under § 365(c), of an International application No. PCT/KR2021/013270, filed on Sep. 28, 2021, which is based on and claims the benefit of a Chinese patent application number 202011049074.6, filed on Sep. 29, 2020, in the Chinese Intellectual Property Office, of a Chinese patent application number 202011310759.1, filed on Nov. 20, 2020, in the Chinese Intellectual Property Office, and of a Korean patent application number 10-2021-0049086, filed on Apr. 15, 2021, in the Korean Intellectual Property Office, the disclosure of each of which is incorporated by reference herein in its entirety.

BACKGROUND

1. Field

The disclosure relates to a field of human-computer interaction. More particularly, the disclosure relates to a method and a device for performing plane detection.

2. Description of Related Art

In the field of human-computer interaction, augmented reality (AR) is one of the important branches. Augmented Reality is an interactive experience of real world environment. In this experience, objects residing in the real world are enhanced by perceptual information generated by a computer, sometimes across multiple sensory modes, including vision, hearing, touch, somatosensory and smell, or the like. An augmented reality system can be defined as a system that meets three basic characteristics a combination of the real world and a virtual world, real-time interaction, and precise three-dimensional registration of virtual and real objects. Superimposed sensory information can be augment to a real environment, or concealment of the real environment.

With the popularization of mobile smart apparatuses and the huge increase in computing power, an augmented reality technology has made considerable progress in the past few years. As a new human-computer interaction technology, Augmented Reality can display physical objects and data information in real scenes more intuitively. More and more researches are beginning to explore how to better combine virtual objects with the real environment to provide better immersive sensory experience.

A plane detection technology is one of the key technologies of Augmented Reality. This technology can detect the position and size of various planes (such as ground, desktop, wall, or the like) in the real environment. In Augmented Reality, virtual items can be placed on these detected planes. Accurate plane detection results are one of the key factors for augmented reality applications to provide good user experience.

The above information is presented as background information only to assist with an understanding of the disclosure. No determination has been made, and no assertion is made, as to whether any of the above might be applicable as prior art with regard to the disclosure.

DISCLOSURE

Technical Problem

The existing plane detection methods not only fail to detect planes in texture-less regions (such as solid-colored walls, desktops, or the like) in image scenes, but the obtained planes are not aligned with the boundaries of real objects. In view of this, a method and a device capable of accurately detecting a plane are needed.

Aspects of the disclosure are to address at least the above-mentioned problems and/or disadvantages and to provide at least the advantages described below. Accordingly, an aspect of the disclosure is to provide a method and a device for performing plane detection.

Technical Solution

Additional aspects will be set forth in part in the description which follows and, in part, will be apparent from the description, or may be learned by practice of the presented embodiments.

In accordance with an aspect of the disclosure, a method for performing plane detection is provided. The method includes acquiring an input image, extracting features of the input image and estimate a depth map of the input image based on the extracted features, using a deep neural network, performing region segmentation using the depth map to detect plane regions in the input image.

According to an embodiment of the disclosure, the deep neural network may comprise a feature extractor for extracting features of the input image, a depth estimation branch for estimating depth information of the input image, and a normal estimation branch for estimating normal information of the input image, wherein, in estimating the depth map of the input image, the depth information estimated by the depth estimation branch is optimized using the normal information estimated by the normal estimation branch.

According to an embodiment of the disclosure, in estimating the depth map of the input image, a feature map of predetermined resolution obtained by feature extraction of the input image using the feature extractor may be fused with a depth feature map of the same resolution generated in depth estimation using the depth estimation branch and a normal feature map of the same resolution generated in normal estimation using the normal estimation branch, respectively, to obtain the depth map using the fused depth feature map and the fused normal feature map.

According to an embodiment of the disclosure, the optimizing of the depth information estimated by the depth estimation branch using the normal information estimated by the normal estimation branch may comprise extracting information related to a region in the normal feature map where normal feature change exceeds a predetermined degree and optimizing the depth feature map using the information to obtain the optimized depth feature map.

According to an embodiment of the disclosure, the extracting of the information related to the region in the normal feature map where the normal feature change exceeds the predetermined degree and the optimizing of the depth feature map using the information comprises performing horizontal depth convolution and vertical depth convolution on the normal feature map, respectively, and obtaining a horizontal attention map and a vertical attention map for the information using an activation function, obtaining the optimized depth feature map based on the horizontal attention map, the vertical attention map and the depth feature map.

According to an embodiment of the disclosure, the obtaining of the optimized depth feature map based on the horizontal attention map, the vertical attention map, and the depth feature map may comprise weighting the horizontal attention map and the vertical attention map, fusing the weighted horizontal attention map and the weighted vertical attention map with the depth feature map to obtain the optimized depth feature map.

According to an embodiment of the disclosure, the performing of the region segmentation using the depth map to detect the plane regions in the input image may comprise calculating three-dimensional points and depth-continuous regions in the input image for plane estimation using the depth map, and performing the region segmentation using the calculated three-dimensional points and information of the depth-continuous regions to detect the plane regions in the input image.

According to an embodiment of the disclosure, the performing of the region segmentation using the calculated three-dimensional points and the information of the depth-continuous regions to detect the plane regions in the input image may comprise calculating a normal map of the input image using the calculated three-dimensional points, and fusing the calculated normal map with a normal map estimated by the deep neural network, clustering using the fused normal map and the information of the depth-continuous regions to segment out the plane regions.

According to an embodiment of the disclosure, the performing of the region segmentation using the calculated three-dimensional points and the information of the depth-continuous regions to detect the plane regions in the input image may comprise calculating a normal map of the input image using the calculated three-dimensional points, clustering using the calculated normal map and the information of the depth-continuous regions to segment out the plane regions.

According to an embodiment of the disclosure, the deep neural network may comprise a feature extractor for extracting features of the input image, and a depth estimation branch for estimating depth information of the input image, wherein, in estimating the depth map of the input image, a feature map of predetermined resolution obtained by feature extraction of the input image using the feature extractor is fused with a depth feature map of the same resolution generated in depth estimation using the depth estimation branch, to generate the depth map using the fused depth feature map.

According to an embodiment of the disclosure, the method may further comprise refining boundaries of the detected plane regions so that the boundaries of the plane regions are aligned with boundaries of real objects in the input image.

According to an embodiment of the disclosure, the refining of the boundaries of the detected plane regions may comprise acquiring a discrete label value corresponding to the detected each plane region, respectively, converting the detected each plane region into a three-dimensional volume based on the discrete label value, refining the plane regions based on the converted three-dimensional volume and the input image, so that the boundaries of the plane regions are aligned with the boundaries of the real objects in the input image.

According to an embodiment of the disclosure, the refining of the boundaries of the detected plane regions may comprise acquiring region information corresponding to each pixel in the input image based on the detected each plane region, acquiring plane weight information of the each pixel in a four-channel image including the input image and a two-dimensional single-channel image including the region information, based on the shortest distance on the two-dimensional single-channel image between the each pixel and the boundaries of the detected each plane region, determining similarity between pixels based on a pixel value, the region information and the plane weight information corresponding to the each pixel, and performing image segmentation based on the similarity between the each pixel to obtain the refined plane region boundaries.

In accordance with another aspect of the disclosure, a device for performing plane detection is provided. The device includes an image acquisition unit configured to acquire an input image, an estimation unit configured to extract features of the input image and estimate a depth map of the input image based on the extracted features using a deep neural network, a region segmentation unit performing region segmentation using the depth map to detect plane regions in the input image.

According to an embodiment of the disclosure, the deep neural network may comprise a feature extractor for extracting the features of the input image, a depth estimation branch for estimating depth information of the input image, and a normal estimation branch for estimating normal information of the input image, wherein, in estimating the depth map of the input image, the estimation unit optimizes the depth information estimated by the depth estimation branch using the normal information estimated by the normal estimation branch.

According to an embodiment of the disclosure, in estimating the depth map of the input image, the estimation unit may fuse a feature map of predetermined resolution obtained by feature extraction of the input image using the feature extractor with a depth feature map of the same resolution generated in depth estimation using the depth estimation branch and a normal feature map of the same resolution generated in normal estimation using the normal estimation branch, respectively, to obtain the depth map using the fused depth feature map and the fused normal feature map.

According to an embodiment of the disclosure, the estimation unit optimizing the depth information estimated by the depth estimation branch using the normal information estimated by the normal estimation branch may comprise extracting information related to a region in the normal feature map where normal feature change exceeds a predetermined degree and optimizing the depth feature map using the information to obtain the optimized depth feature map.

According to an embodiment of the disclosure, the extracting of the information related to the region in the normal feature map where the normal feature change exceeds the predetermined degree and the optimizing of the depth feature map using the information may comprise performing horizontal depth convolution and vertical depth convolution on the normal feature map, respectively, and obtaining a horizontal attention map and a vertical attention map for the information using an activation function, obtaining the optimized depth feature map based on the horizontal attention map, the vertical attention map and the depth feature map.

According to an embodiment of the disclosure, the obtaining of the optimized depth feature map based on the horizontal attention map, the vertical attention map, and the depth feature map may comprise weighting the horizontal attention map and the vertical attention map, fusing the weighted horizontal attention map and the weighted vertical attention map with the depth feature map to obtain the optimized depth feature map.

According to an embodiment of the disclosure, the performing of the region segmentation using the depth map to detect the plane regions in the input image may comprise calculating three-dimensional points and depth-continuous regions in the input image for plane estimation using the depth map, and performing the region segmentation using the calculated three-dimensional points and information of the depth-continuous regions to detect the plane regions in the input image.

According to an embodiment of the disclosure, the performing of the region segmentation using the calculated three-dimensional points and the information of the depth-continuous regions to detect the plane regions in the input image may comprise calculating a normal map of the input image using the calculated three-dimensional points, and fusing the calculated normal map with a normal map estimated by the deep neural network, clustering using the fused normal map and the information of the depth-continuous regions to segment out the plane regions.

According to an embodiment of the disclosure, the performing of the region segmentation using the calculated three-dimensional points and the information of the depth-continuous regions to detect the plane regions in the input image may comprise calculating a normal map of the input image using the calculated three-dimensional points, clustering using the calculated normal map and the information of the depth-continuous regions to segment out the plane regions.

According to an embodiment of the disclosure, the deep neural network may comprise a feature extractor for extracting features of the input image, and a depth estimation branch for estimating depth information of the input image, wherein, in estimating the depth map of the input image, the estimation unit may fuse a feature map of predetermined resolution obtained by feature extraction of the input image using the feature extractor with a depth feature map of the same resolution generated in depth estimation using the depth estimation branch, to generate the depth map using the fused depth feature map.

According to an embodiment of the disclosure, the device may further comprise a plane boundary refinement unit configured to refine boundaries of the detected plane regions so that the boundaries of the plane regions are aligned with boundaries of real objects in the input image.

According to an embodiment of the disclosure, the refining of the boundaries of the detected plane regions may comprise acquiring a discrete label value corresponding to the detected each plane region, respectively, converting the detected each plane region into a three-dimensional volume based on the discrete label value, refining the plane regions based on the converted three-dimensional volume and the input image, so that the boundaries of the plane regions are aligned with the boundaries of the real objects in the input image.

According to an embodiment of the disclosure, the refining of the boundaries of the detected plane regions may comprise acquiring region information corresponding to each pixel in the input image based on the detected each plane region, acquiring plane weight information of the each pixel in a four-channel image including the input image and a two-dimensional single-channel image including the region information, based on the shortest distance on the two-dimensional single-channel image between the each pixel and the boundaries of the detected each plane region, determining similarity between pixels based on a pixel value, the region information and the plane weight information corresponding to the each pixel, and performing image segmentation based on the similarity between the each pixel to obtain the refined plane region boundaries.

In accordance with another aspect of the disclosure, an electronic device is provided. The electronic device includes a processor and a memory storing instructions is provided, wherein the instructions, when executed by the processor, cause the processor to execute the method as described above.

In accordance with another aspect of the disclosure, a computer-readable recording medium having program instructions recorded thereon is provided, wherein the instructions, when executed by the processor, cause the processor to execute the method as described above.

Advantageous Effects

According to a plane detection method and a device for plane detection of the disclosure, since planes are detected based on depth map of a whole input image, the planes may be detected in a texture-free region.

In addition, on this basis, the accuracy of the plane detection may be effectively improved by optimizing depth information through feature map fusion and/or using normal information, and boundaries of the detected plane regions may be aligned with boundaries of real objects in the input image by further performing a plane refinement operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
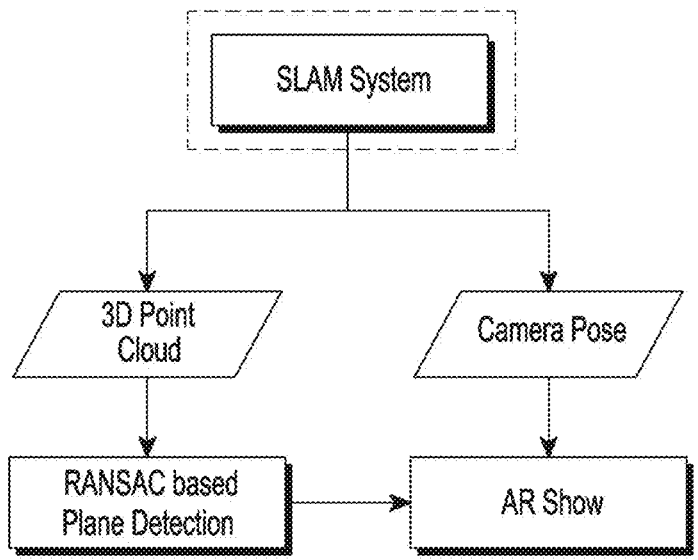
FIG. 1 is a schematic diagram of plane detection in an existing augmented reality framework according to an embodiment of the disclosure.

FIG. 1 is a schematic diagram of plane detection in an existing augmented reality framework according to an embodiment of the disclosure;

Referring to FIG. 1, the plane detection method in the existing augmented reality framework is highly depended on three-dimensional point cloud from a simultaneously localization and mapping (SLAM) system. Specifically, the existing AR framework takes the three-dimensional point cloud from the SLAM system as an input, and performs plane parameter fitting using random sample consensus (RANSAC) to complete the plane detection. Subsequently, the AR content is displayed in combination with camera pose. It may be seen that the existing plane detection method detects planes based on sparse three-dimensional point cloud generated by the SLAM system.

The SLAM system first extracts feature points from an input image and matches the extracted two-dimensional feature points, and then calculates three-dimensional points using the matched two-dimensional feature points. Since the two-dimensional feature points cannot be detected on a texture-less region, the SLAM system fails to obtain the three-dimensional points corresponding to the texture-less region, resulting in that the existing method cannot perform the plane detection on the texture-less region.

Secondly, as described above, the existing plane detection method performs the plane detection based on the sparse three-dimensional point cloud output by the SLAM system. However, the sparse three-dimensional point cloud cannot provide enough information to accurately estimate boundaries of a plane, so the detected boundaries of the plane cannot be aligned with boundaries of a real object.

In view of this, the disclosure proposes a new plane detection method and device. Hereinafter, the concept and embodiments of performing the plane detection of the disclosure will be described with reference to FIGS. 2 to 15.

Figure 2:
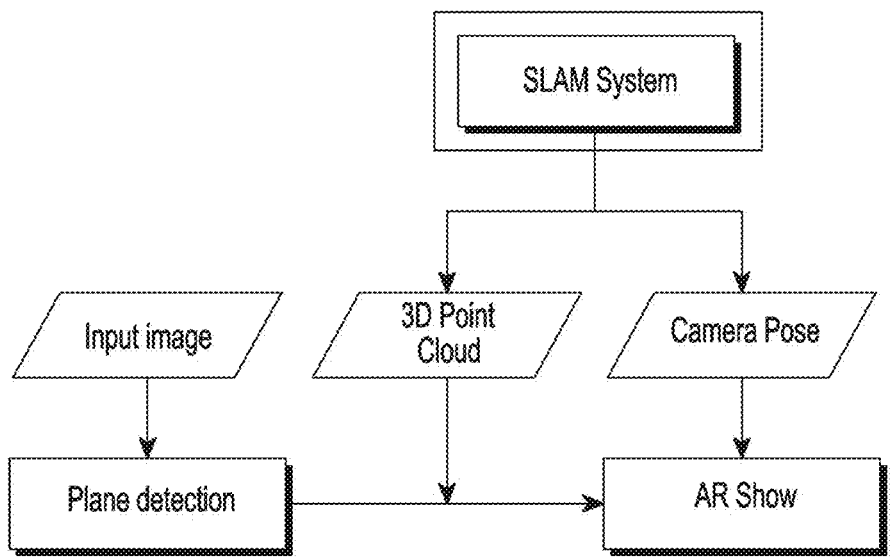
FIG. 2 is a schematic diagram of plane detection in an augmented reality framework according to an embodiment of the disclosure.

FIG. 2 is a schematic diagram of plane detection in an augmented reality framework according to an embodiment of the disclosure.

Referring to FIG. 2, the disclosure directly detects planes based on an input image (which may be a color image), instead of performing the plane detection depending on the sparse three-dimensional point cloud output by the SLAM system. Since information in a whole image is used for the plane detection, the disclosure may perform the plane detection on a texture-less region.

In order to address the issue that existing methods cannot perform plane detection in a texture-less region, the disclosure designs a deep neural network for acquisition of scene information. The deep neural network provides information about a whole scene including the texture-less region for estimating planes in the scene.

In order to address the issue that the detected planes cannot be aligned with boundaries of real objects, the disclosure adopts a depth region segmentation technology to obtain an initial plane, and adopts a plane boundary refinement technology to align the boundaries of the detected initial planes with the boundaries of the real objects.

Hereinafter, referring to FIGS. 3 to 14, a method for performing plane detection according to an embodiment of the disclosure will be described.

Figure 3:
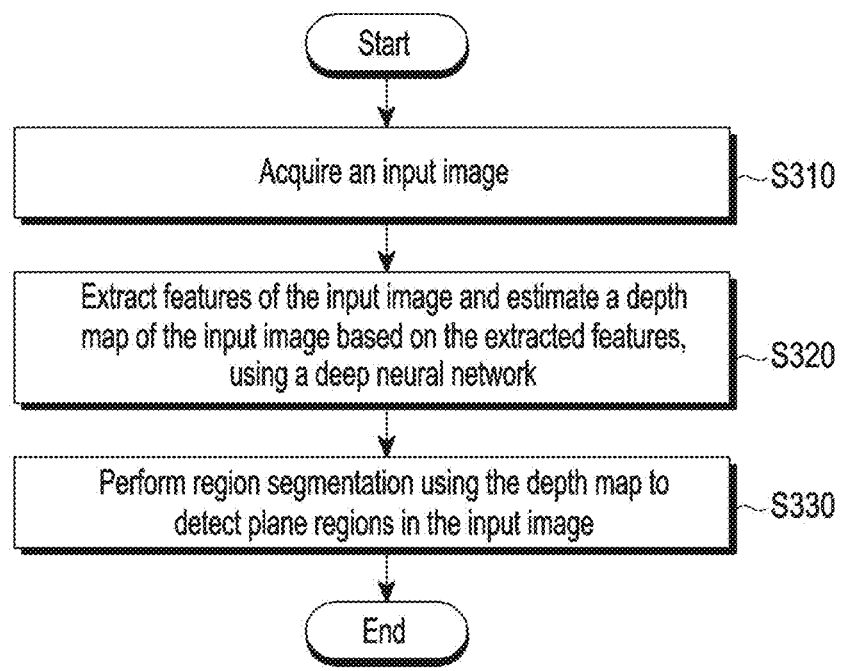
FIG. 3 is a flowchart of a method for performing plane detection according to an embodiment of the disclosure.

FIG. 3 is a flowchart of a method for performing plane detection according to an embodiment of the disclosure (hereinafter, for convenience of description, it is referred to as "a plane detection method").

Referring to FIG. 3, in operation S310, an input image is acquired. For example, the input image may be acquired through a camera in response to a user request, and in addition, the input image may be acquired in real time. It should be noted that the disclosure does not have any limitation on the way of acquiring the input image.

In operation S320, a deep neural network is used to extract features of the input image and estimate a depth map of the input image based on the extracted features. Wherein the above neural network may be used to acquire scene information. As an example, for example, the features of the input image may be extracted to generate a feature map of ½ resolution, a feature map of ¼ resolution, a feature map of ⅛ resolution, and a feature map of 1/16 resolution and a feature map of 1/32 resolution, and the like of the input image, and then, the depth map of the input image is finally estimated using various deconvolution and convolution operations (used to enlarge the feature map to predict a more large-size depth map and normal map) of the layers used for information estimation in the deep neural network based on the generated feature map.

In operation S330, the depth map is used to perform region segmentation to detect plane regions in the input image.

According to an embodiment of the disclosure, in operation S330, the depth map may be used to calculate the three-dimensional points and depth-continuous regions in the input image for plane estimation, and the calculated three-dimensional points and information of the depth-continuous regions are used to perform region segmentation to detect the plane regions in the input image.

Specifically, for example, the depth map may be used to calculate the three-dimensional points in the following manner: according to a camera imaging model (for example, a pinhole camera model), the following equation can be used to calculate the three-dimensional points:

$$Z \begin{pmatrix} u \\ v \\ 1 \end{pmatrix} = \begin{pmatrix} fx & 0 & cx \\ 0 & fy & cy \\ 0 & 0 & 1 \end{pmatrix} \begin{pmatrix} X \\ Y \\ Z \end{pmatrix} \quad \text{Equation 1}$$

Wherein, u and v are image pixel coordinates, fx and fy are focal lengths, and cx and cy are image principal points. Traversing each pixel in the image, Z is the depth in the depth map corresponding to the pixel, and substituting u, v, Z into the above equation, the X and Y coordinates of the space point can be obtained, so that all three-dimensional points corresponding to the whole image can be obtained.

Although the above method of calculating three-dimensional points using the depth map is listed as an example, it is clear to those skilled in the art that other calculation methods of three-dimensional point may also be used, and the disclosure does not limit the specific calculation methods of three-dimensional points.

In addition, for example, the depth-continuous regions may be calculated using the depth map in the following manner: using a relatively simple region growth method, first, calculate normal vector of each point using the three-dimensional points of the neighborhood of the point (such as 9×9), then, set a certain threshold (For example, 10 degrees) and compare normal vectors of adjacent points one by one, if the result is within the certain threshold, two points are considered to be continuous, and their average value is used as the normal vector of the continuous region after merging, and then continue to compare with the adjacent points or other continuous regions.

Similarly, although the above method of calculating the depth-continuous regions using the depth map is listed as an example, it is clear to those skilled in the art that other methods may also be used to calculate the depth-continuous regions.

According to an embodiment of the disclosure, after calculating the three-dimensional points and the depth-continuous regions, the region segmentation is performed to detect the plane regions in the input image using the calculated three-dimensional points and the information of the depth-continuous regions by the following manner: calculating a normal map of the input image using the three-dimensional points, and fusing the calculated normal map with the normal map estimated by the deep neural network, and clustering to segment out the plane regions using the fused normal map and the information of the depth-continuous regions.

Alternatively, after calculating the three-dimensional points and the depth-continuous regions, the region segmentation may be performed to detect the plane regions in the input image using the calculated three-dimensional points and the information of the depth-continuous regions by the following manner: calculating a normal map of the input image using the calculated three-dimensional points, and clustering to segment out the plane regions using the calculated normal map and the information of the depth-continuous regions. In addition, it is clear to those skilled in the art that the method of performing the region segmentation to detect the plane regions in the input image using the calculated three-dimensional points and the information of the depth-continuous regions is not limited to the above example.

As described above, since the plane detection method of the disclosure uses the information of the whole input image to estimate the depth map of the input image, and uses the depth map to detect the plane regions in the input image, instead of performing the plane detection using sparse feature points generated by a SLAM system, therefore, it is possible to realize the plane detection even in a texture-less region.

Alternatively, the above-mentioned plane detection method may further include the following steps (not shown in FIG. 3): refining boundaries of the detected plane regions so that the boundaries of the plane regions are aligned with boundaries of real objects in the input image.

Hereinafter, the content involved in the plane detection method according to the embodiment of the disclosure will be described with reference to FIGS. 4 to 14.

According to one embodiment of the disclosure, the deep neural network mentioned in operation S320 may include a feature extractor for extracting features of an input image, a depth estimation branch for estimating depth information of the input image, and a normal estimation branch for estimating normal information of the input image.

However, the structure of the deep neural network is not limited to the above examples. For example, alternatively, according to another embodiment of the disclosure, the deep neural network may not include a normal estimation branch but includes a feature extractor for extracting features of the input image, and a depth estimation branch used to estimate depth information of the input image. The disclosure does not limit the specific structure of the deep neural network, as long as it may extract the features of the input image and may at least estimate the depth map of the input image. According to an embodiment of the disclosure, the deep neural network may estimate a normal map of the input image in addition to the depth map of the input image.

Figure 4:
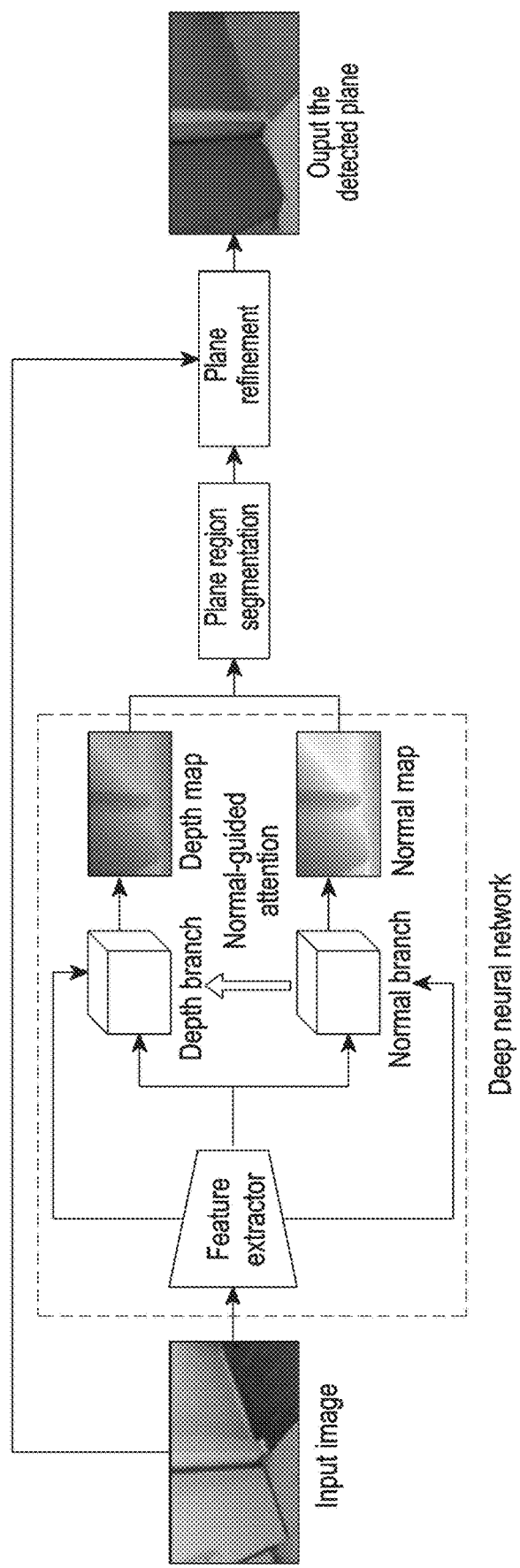
FIG. 4 is a schematic diagram of a plane detection method according to an embodiment of the disclosure.

FIG. 4 is a schematic diagram of plane detection method according to an embodiment of the disclosure.

Referring to FIG. 4, the input image is first input to the deep neural network and then the detected planes are output through plane region segmentation and plane region refinement. In this embodiment of the disclosure, considering that the depth information and the surface normal information of the image are closely related, the deep neural network is set to include a feature extractor for extracting features of the input image, a depth estimation branch for estimating depth information of the input image and a normal estimation branch for estimating normal information of the input image.

The deep neural network may simultaneously estimate the depth information and the normal information from an input single image in a multi-task manner, thereby obtaining a dense three-dimensional point cloud for the plane estimation. Specifically, the input image may be first input into the feature extractor of the deep neural network for feature extraction, and then the extracted features are respectively input into the depth estimation branch and the normal estimation branch.

The depth estimation branch may perform depth estimation to output the depth map, and the normal estimation branch may perform normal estimation to output the normal map, and the depth map and the normal map may be used in the plane region segmentation. In addition, in the embodiment of FIG. 4, in estimating the depth map of the input image, the depth information estimated by the depth estimation branch is optimized using the normal information estimated by the normal estimation branch. In FIG. 4, this approach is called as "the normal-guided attention mechanism" In this way, by optimizing the depth information estimated by the depth estimation branch using the normal information estimated by the normal estimation branch, the estimated depth map can be made more accurate, thereby improving the accuracy of the plane detection.

Hereinafter, the deep neural network in the plane detection method shown in FIG. 4 will be described in conjunction with FIG. 5.

Figure 5:
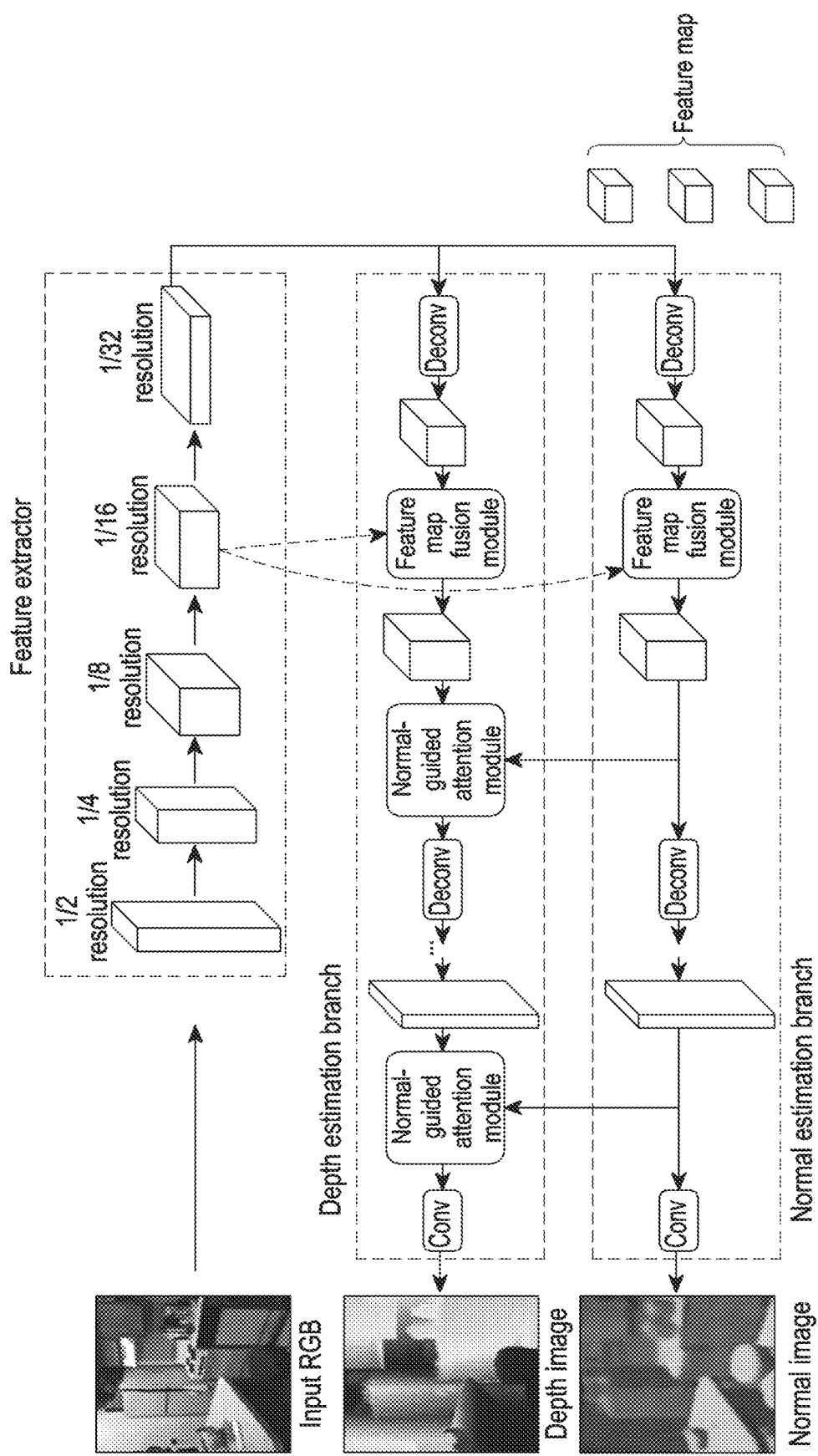
FIG. 5 is a schematic diagram of operations of a deep neural network according to an embodiment of the disclosure.

FIG. 5 is a schematic diagram of operations of a deep neural network according to an embodiment of the disclosure. In the example of the deep neural network in FIG. 5, a feature fusion module and a normal-guided attention module may be included in the depth estimation branch and the normal estimation branch.

Referring to FIG. 5, specifically, in estimating the depth map of the input image, a feature map of predetermined resolution obtained by feature extraction of the input image using the feature extractor is fused with a depth feature map of the same resolution generated in depth estimation using the depth estimation branch and a normal feature map of the same resolution generated in normal estimation using the normal estimation branch, respectively, to obtain the depth map using the fused depth feature map and the fused normal feature map. The above operations are the operations performed by the feature fusion module.

Here, the predetermined resolution may be, for example, ⅛ resolution and 1/16 resolution, but is not limited thereto. Selecting feature maps of partial resolution (such as the feature maps of ⅛ and 1/16 resolution) for fusion may accelerate the training speed of the neural network while improving the accuracy and the detail information of the final depth map and normal map.

Specifically, the feature fusion module in the depth estimation branch may fuse the feature map of the predetermined resolution obtained by the feature extraction of an input image using the feature extractor with the depth feature map of the same resolution generated in the depth estimation. The feature fusion module in the normal estimation branch may fuse the feature map of the predetermined resolution obtained by the feature extraction of the input image using the feature extractor with the normal feature map of the same resolution generated in the normal estimation (refer to the normal-guided attention module in the drawings).

Through the fusion of the feature maps, the accuracy and detail information of the final depth map and normal map may be improved. For example, the spatial details of the final result of the depth estimation and the normal estimation may be restored, thereby enabling a more accurate plane detection result to be provided. In addition, the fusion of the feature maps also contributes to accelerating the training speed of the deep neural network.

Figure 6:
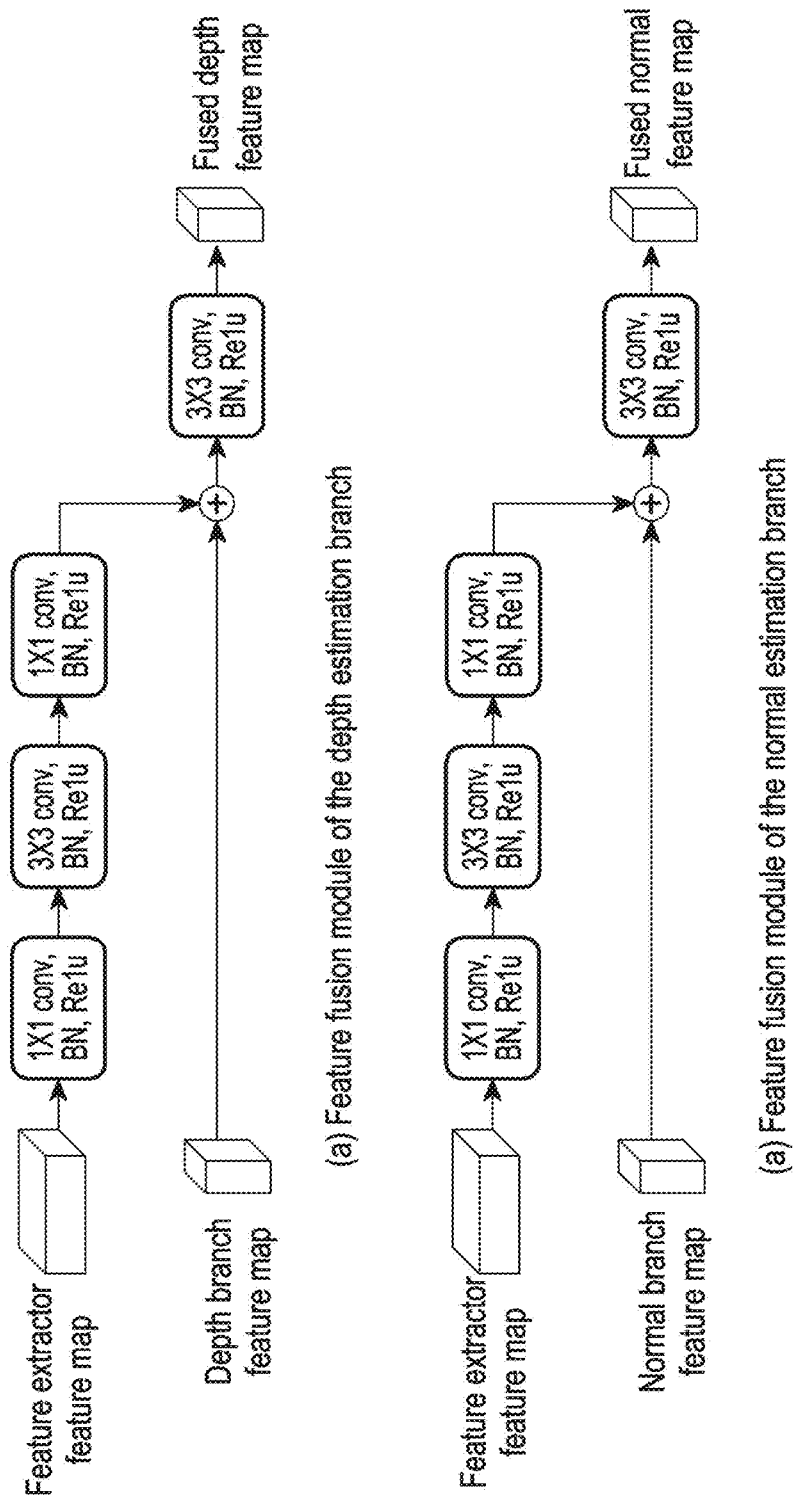
FIG. 6 is a schematic diagram illustrating operations performed by a feature fusion module according to an embodiment of the disclosure.

FIG. 6 is a schematic diagram illustrating operations performed by a feature fusion module according to an embodiment of the disclosure.

Referring to FIG. 6, hereinafter, the operations performed by the feature fusion module will be described. First, the feature map of the predetermined resolution (hereinafter, for the convenience of description, it is abbreviated as "a feature extractor feature map") obtained using the input feature extractor (for example, DenseNet Encoder) and the depth feature map and the normal feature map of the same resolution are input into the feature fusion module respectively.

Secondly, the input feature extractor feature map is processed using three groups (the specific number is not limited, the three groups are just an example) processing units including two-dimensional convolution, batch normalization (BN), and activation function Relu, wherein the purpose of the first group of the processing units is to reduce the number of channels of the input feature map, and the function of the second group of the processing units is to extract the features related to the feature map to be fused from the feature extractor feature map and migrate them from a feature domain of the feature extraction to a feature domain of the features to be fused, and the function of the last group of the processing units is to adjust the number of output channels to be equal to the number of channels of the input depth feature map (or the normal feature map). Thereafter, the processed feature map output in the previous step is added with the corresponding elements of the input depth feature map (or the feature map of the normal branch).

Finally, the feature map output in the previous step is processed using another processing unit including 3×3 convolution, batch normalization and activation function Relu to obtain the fused depth feature map (or the normal feature map).

It should be noted that the above operations performed on the feature map are not limited to being processed by the above processing units (for example, the activation function used may not be limited to Relu), and the specific method of the fusion of the feature maps is not limited to the example shown in FIG. 6, and method of the fusion of the feature maps in the published information may be used.

Next, the operations performed by the normal-guided attention module in FIG. 5 are described. As described above, in estimating the depth map of the input image, the depth information estimated by the depth estimation branch is optimized using the normal information estimated by the normal estimation branch.

Figure 8:
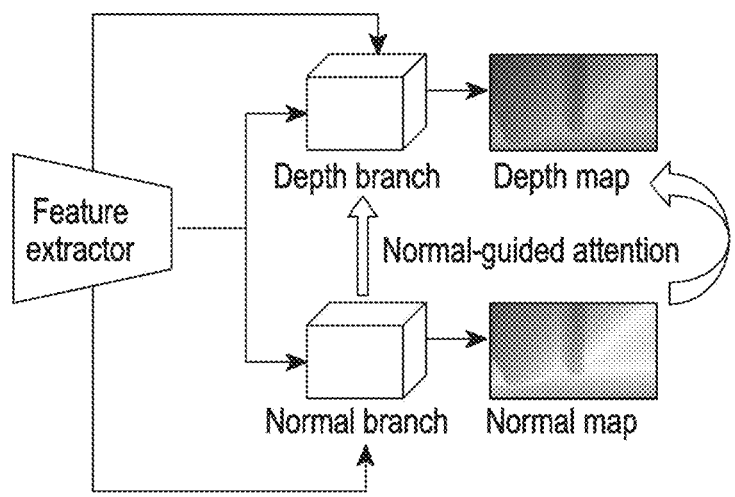
FIG. 8 is a schematic diagram of optimizing depth information using normal information according to an embodiment of the disclosure.

FIG. 8 is a schematic diagram of optimizing depth information using normal information according to an embodiment of the disclosure.

Referring to FIG. 8, at each stage of the depth estimation branch and the normal estimation branch, the output of the depth estimation branch may be optimized by using the output of the normal estimation branch. For example, the high-frequency information in the normal feature map that reflects the normal information in the normal estimation branch (i.e., the information related to the region in the normal feature map where the normal feature change exceeds a predetermined degree) may be used to optimize the depth feature map in the depth estimation branch, resulting that the depth feature map in the depth estimation branch remains sensitive in a region where the normal information changes obviously but the depth information changes slightly, so that the final depth map has sharp edges in these regions, and then it may provide more accurate three-dimensional points for the plane detection.

Figure 7:
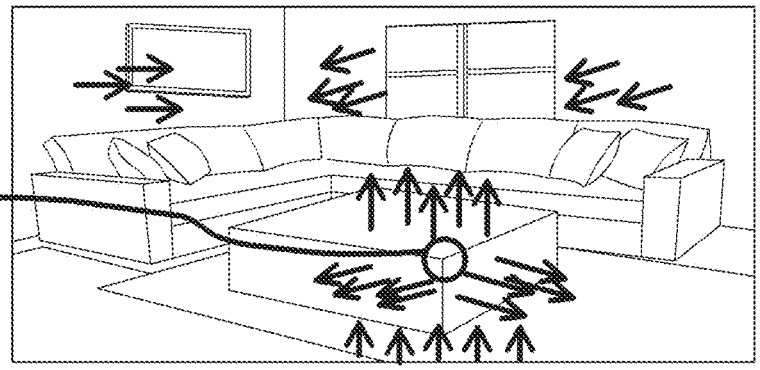
FIG. 7 is a schematic diagram of a region where normal information changes obviously but depth information changes slightly according to an embodiment of the disclosure.

FIG. 7 is a schematic diagram of a region where normal information changes obviously but the depth information changes slightly according to an embodiment of the disclosure.

Referring to FIG. 7, the region marked by a circle is the region where the normal information changes obviously but the depth information does not change much, and the high frequency information in the normal feature map is used to optimize the depth feature map in the depth estimation branch, so that the depth feature map may remain sensitive in the region where the normal information changes obviously but the depth information changes slightly, and thus the finally obtained depth map has sharp edges in these regions.

Returning to operate FIG. 5, optimizing the depth information estimated by the depth estimation branch using the normal information estimated by the normal estimation branch may include: extracting information related to the region in the normal feature map where the normal feature change exceeds the predetermined degree and optimizing the depth feature map using the information to obtain the optimized depth feature map.

Extracting the information related to the region in the normal feature map where the normal feature change exceeds the predetermined degree and optimizing the depth feature map using the information may include: firstly, performing horizontal depth convolution and vertical depth convolution on the normal feature map respectively, and obtaining a horizontal attention map and a vertical attention map for the information using an activation function; secondly, obtaining the optimized depth feature map based on the horizontal attention map, the vertical attention map and the depth feature map. As an example, obtaining the optimized depth feature map based on the horizontal attention map, the vertical attention map, and the depth feature map may include: weighting the horizontal attention map and the vertical attention map, and fusing the weighted horizontal attention map and the vertical attention map with the depth feature map to obtain the optimized depth feature map.

The above optimization operation is performed by the normal-guided attention module shown in FIG. 5.

Figure 9:
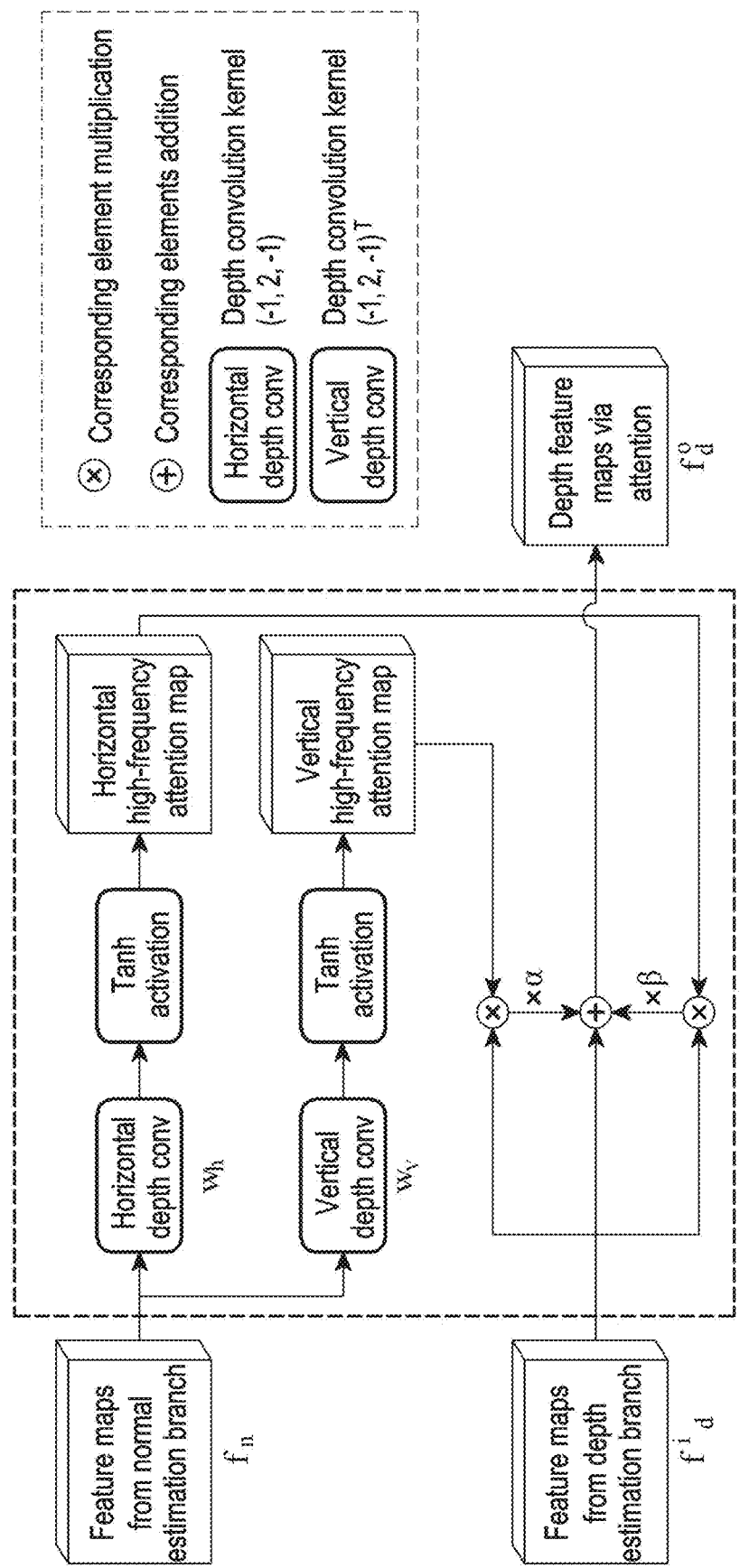
FIG. 9 is a schematic diagram illustrating operations performed by a normal-guided attention module according to an embodiment of the disclosure.

FIG. 9 is a schematic diagram illustrating operations performed by a normal-guided attention module according to an embodiment of the disclosure. The above optimization operation will be exemplified below with reference to FIG. 9. Referring to FIG. 9, first, the fused depth feature map Pond the fused normal feature map $f_n$ are respectively input into the normal-guided attention module.

Then, the normal feature map $f_n$ is operated using the horizontal depth convolution $w_h$ with the convolution kernel of (−1, 2, −1) and the vertical depth convolution $w_v$ with the convolution kernel of (−1, 2, −1) T respectively, and the Tanh activation function is used to obtain a horizontal attention map and a vertical attention map respectively. The horizontal attention map and the vertical attention map here are the attention maps for the high-frequency information in the normal feature map. Therefore, they are also called as "a horizontal high-frequency attention map" and "a vertical high-frequency attention map" in FIG. 9 respectively. Thereafter, the horizontal and vertical attention maps are used to multiply the input depth feature map $f_d^i$ respectively (a method of fusion, other fusion methods may also be used), to obtain a horizontal attention result and a vertical attention result.

Finally, the horizontal attention result and the vertical attention result are added with the corresponding elements of the input depth branch feature map $f_d^i$ using the weight coefficients α and β respectively to obtain the optimized depth feature map. In summary, the attention-guided depth feature map output by this module may be described by the following Equation 2:

$$f_d^o = f_d^i + \alpha \cdot \tanh(w_h * f_n) \cdot f_d^i + \beta \tanh(w_v * f_n) \cdot f_d^i \qquad \text{Equation 2}$$

wherein, $f_d^i$ and $f_n$ are the input depth feature map and the input normal feature map respectively, $w_h$ and $w_v$ are the horizontal depth convolution and vertical depth convolution respectively, tanh is the activation function, and α and β are the weight coefficients.

It should be noted that the specific method of using the high-frequency information in the normal feature map to optimize the depth feature map is not limited to the example in FIG. 9, and other methods may be used as long as the high-frequency information in the normal feature map may be effectively used, although the high-frequency information in the normal feature map (that is, the information related to the region in the normal feature map where the normal feature change exceeds the predetermined degree) is extracted in the example of FIG. 9 and the residual sum method is used to optimize the depth feature map.

The size (−1, 2, −1) and $(-1, 2, -1)^T$ of the vertical depth convolution kernel and the horizontal depth convolution kernel in FIG. 9 is just an example, and it is not limited thereto in practical applications.

It should be noted that the deep neural network shown in the example of FIG. 5 includes both the feature map fusion module and the normal-guided attention module. However, according to an embodiment of the disclosure, the deep neural network may include one of the feature map fusion module and the normal-guided attention module.

In the case that the deep neural network includes both the feature map fusion module and the normal-guided attention module (as shown in FIG. 5), in estimating the depth map of the input image, the normal feature map and the depth feature map used when the depth information estimated by the depth estimation branch is optimized using the normal information estimated by the normal estimation branch may be the fused normal feature map and the fused depth feature map obtained by fusing of the feature maps.

In the case that the deep neural network does not include the feature map fusion module, in estimating the depth map of the input image, the normal feature map and the depth feature map used when the depth information estimated by the depth estimation branch is optimized using the normal information estimated by the normal estimation branch are the normal feature map and the depth feature map without fusing of the feature maps.

Referring back to FIG. 4, in the embodiment of FIG. 4, after obtaining the depth map and the normal map, the depth map and the normal map may be used to perform the plane region segmentation to detect the initial plane. As described above with reference to operation S330 of FIG. 3, after the depth map is estimated, the depth map may be used to calculate the three-dimensional points and the depth-continuous regions in the input image for the plane estimation, and the calculated three-dimensional points and the information of the depth-continuous regions are used to perform the region segmentation to detect the plane regions in the input image.

However, in the case where the deep neural network of FIG. 4 includes the normal estimation branch, performing the region segmentation to detect the plane regions in the input image using the calculated three-dimensional points and the information of the depth-continuous regions may include: calculating the normal map of the input image using the calculated three-dimensional points and fusing the calculated normal map with the normal map obtained using the normal estimation branch; and clustering to segment out the plane regions using the fused normal map and the information of the depth-continuous regions. The above operation may be referred to as "a plane region segmentation operation".

Figure 10:
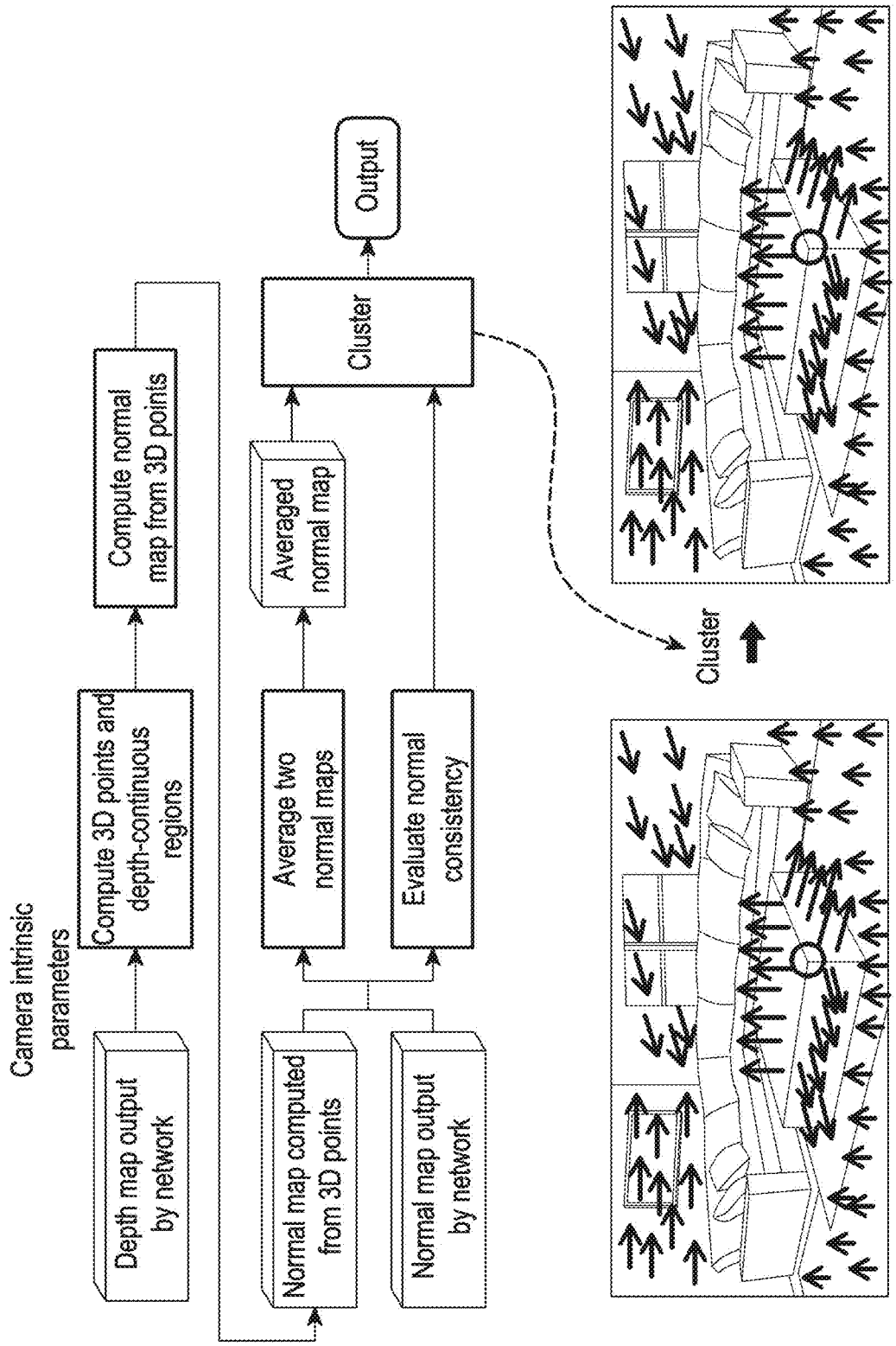
FIG. 10 is a schematic diagram illustrating a plane region segmentation operation according to an embodiment of the disclosure.

FIG. 10 is a schematic diagram illustrating a plane region segmentation operation according to an embodiment of the disclosure. Hereinafter, the example of the plane region segmentation operation will be described with reference to FIG. 10.

Referring to FIG. 10, the result of the plane region segmentation may be obtained by: first, calculating the three-dimensional points and the depth-continuous regions in the input image for the plane estimation using the depth map output by the deep neural network; secondly, calculating the normal map of the input image using the calculated three-dimensional points, and fusing the calculated normal map with the normal map estimated by the deep neural network (for example, the normal map estimated by the normal estimation branch).

For example, as shown in FIG. 10, the following fusion method may be adopted: obtaining an average normal map using the calculated normal map and the normal map estimated by a deep estimation network, and calculating information of normal-consistent region; finally, clustering to segment out the plane regions using the fused normal map, the information of the normal-consistent region and the information of the depth-continuous regions.

It should be noted that the fusion of the calculated normal map and the normal map estimated by the deep neural network is not limited to the above example method, but other fusion methods may be used, for example, calculating a weighted average normal map, and so on.

Referring back to FIG. 4, after the plane regions is detected by the plane region segmentation, alternatively, the boundaries of the plane regions may be continuously refined to align the boundaries of the plane regions with the boundaries of the real objects in the input image. According to an embodiment of the disclosure, refining the boundaries of the detected plane regions may include: obtaining a discrete label value corresponding to the detected each plane region respectively; converting the detected each plane region into a three-dimensional volume based on the discrete label value; refining the plane regions based on the converted three-dimensional volume and the input image, so that the boundaries of the plane regions are aligned with the boundaries of the real objects in the input image.

Figure 11:
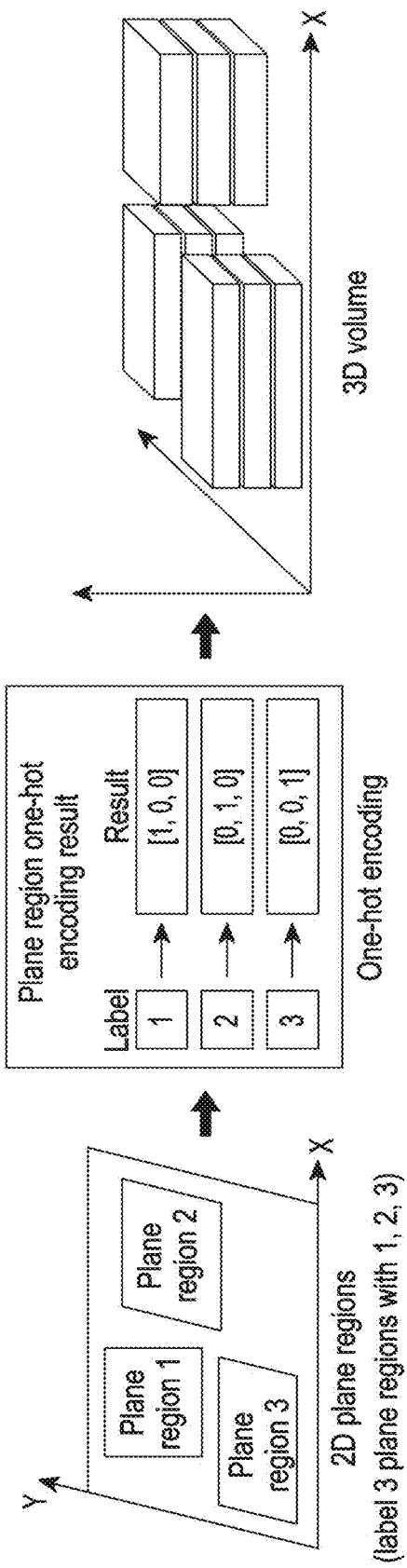
FIG. 11 is a schematic diagram illustrating a plane refinement operation according to an embodiment of the disclosure.

FIG. 11 is a schematic diagram illustrating a plane refinement operation according to an embodiment of the disclosure.

Referring to FIG. 11, first, the each plane region obtained by the plane region segmentation may be numbered using a discrete label value, and then the plane regions labeled may be converted into the three-dimensional volume using one-hot encoding, finally, the boundaries of the plane regions are refined by applying a edge-preserving optimization algorithm (such as a bilateral solver algorithm), using the converted three-dimensional volume and the input color image, so that they are aligned with the boundaries of the real objects of the scene.

For example, the edge-preserving optimization of the three-dimensional volume may be performed layer by layer and the weight of each pixel in different planes after optimization is obtained, and then the label with the largest weight is selected for each pixel as the refined plane label of the pixel, thereby determining the plane that the pixel belongs to.

The plane detection method according to the embodiment of the disclosure has been described above with reference to FIGS. 4 to 11. However, the plane detection method of the disclosure is not limited to the above embodiment.

Figure 12:
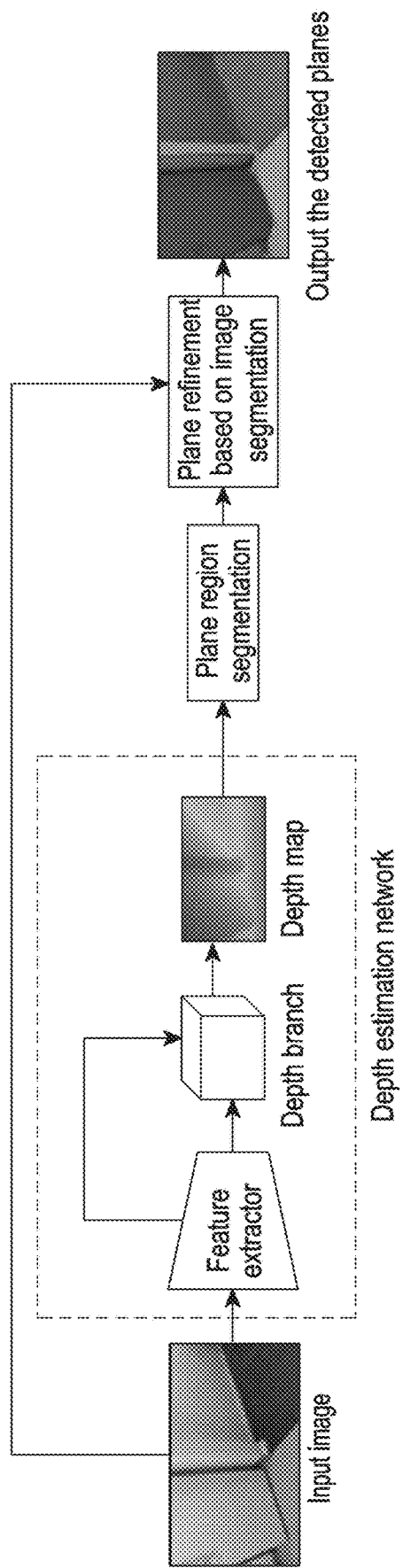
FIG. 12 is a schematic diagram illustrating plane detection method according to an embodiment of the disclosure.

FIG. 12 is a schematic diagram illustrating a plane detection method according to an embodiment of the disclosure.

Referring to FIG. 12, in this embodiment of the disclosure, the deep neural network (also called as the depth estimation network) may include the feature extractor for extracting the features of the input image, and the depth estimation branch (also called as the depth branch) for estimating the depth information of the input image, but does not include the normal estimation branch (also called as the normal branch) for estimating the normal information of the input image as shown in FIG. 5.

Since the deep neural network used in FIG. 12 only includes the depth estimation branch and the feature extractor, but does not include the normal estimation branch, the calculation amount is smaller and the depth information may be obtained in real time, which is advantageous for deployment on mobile apparatuses.

Figure 13:
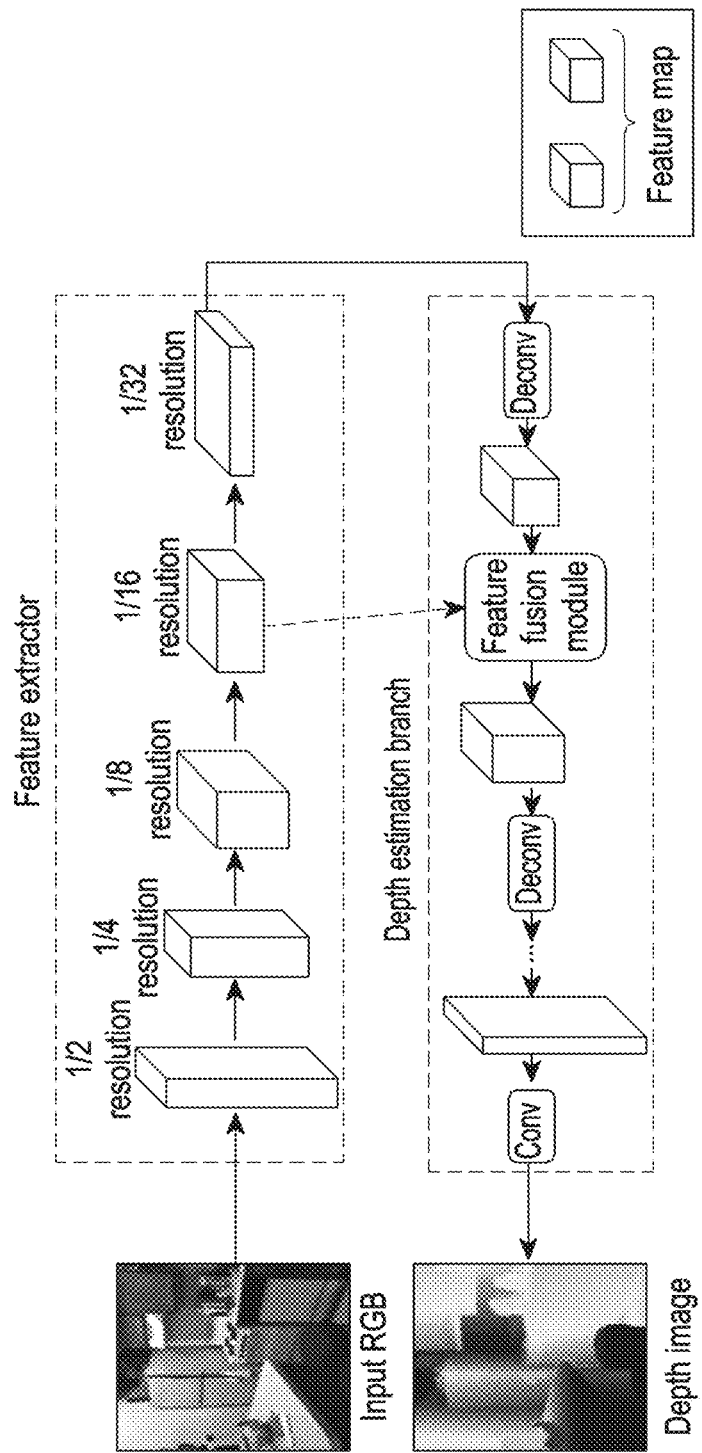
FIG. 13 is a schematic diagram illustrating operations of a deep neural network according to an embodiment of the disclosure.

FIG. 13 is a schematic diagram illustrating operations of a deep neural network according to an embodiment of the disclosure.

Referring to FIG. 13, the above-mentioned feature fusion module is included in the depth estimation branch. Specifically, in estimating the depth map of the input image, a feature map of a predetermined resolution (for example, a feature map of $1/16$ resolution) obtained by feature extraction of the input image using the feature extractor is fused with the depth feature map of the same resolution generated in depth estimation using the depth estimation branch, to generate the depth map using the fused depth feature map. Through the fusion of the feature maps, the accuracy and the detail information of the final depth map may be improved, so that a more accurate plane detection result may be provided.

For example, the feature map generated by the feature extractor is fused with the depth feature map using the method shown in FIG. 7 to obtain the fused depth feature map, and the final depth map is generated using the fused depth map.

Thereafter, the depth map may be used to detect the planes through the plane region segmentation.

Figure 14:
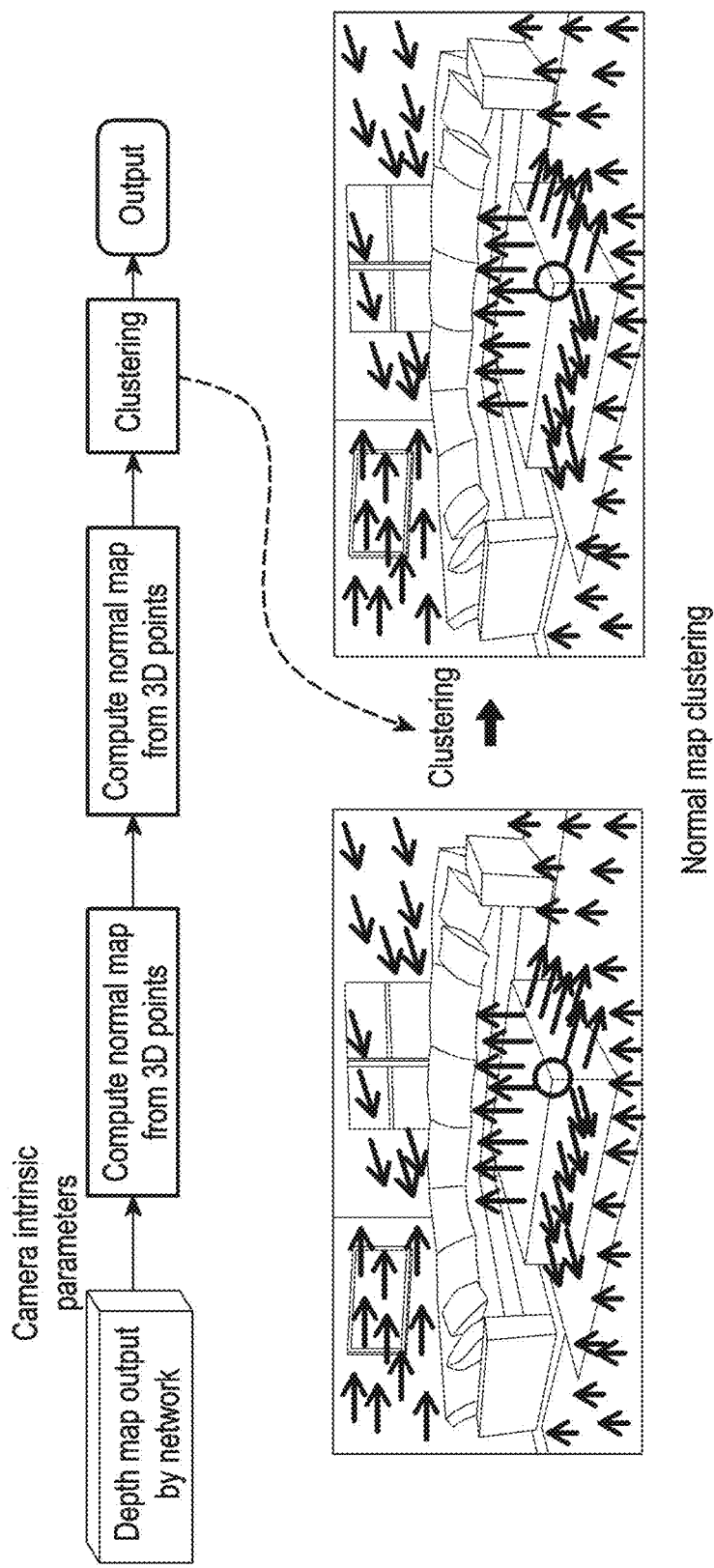
FIG. 14 is a schematic diagram illustrating a plane region segmentation operation according to an embodiment of the disclosure.

FIG. 14 is a schematic diagram illustrating a plane region segmentation operation according to an embodiment of the disclosure.

Referring to FIG. 14, the depth map may be used to calculate the three-dimensional points and the depth-continuous regions in the input image for the plane estimation, and then the calculated three-dimensional points and information of depth-continuous regions are used to perform the region segmentation to detect the plane regions of the input image.

For example, as shown in FIG. 14, performing the region segmentation to detect the plane regions of the input image using the calculated three-dimensional points and the information of depth-continuous regions may include: calculating the normal map of the input image using the calculated three-dimensional points, and clustering to segment out the plane regions using the calculated normal map and the information of the depth-continuous regions.

Referring back to FIG. 13, alternatively, the plane detection method according to another embodiment of the disclosure may continue to refine the boundaries of the detected plane regions after the plane regions is detected through the plane region segmentation, so that the boundaries of the plane regions are aligned with the boundaries of the real objects in the input image. For example, a plane refinement technology based on the image segmentation may be used, but is not limited to thereto.

For example, the plane refinement method described above with reference to FIG. 11 may also be used. Similarly, the following refinement method based on the image segmentation to be described may also be applied to the plane detection method shown in FIG. 4 to refine the boundaries of the plane regions. As an example, refining the boundaries of the detected plane regions may include: acquiring region information corresponding to each pixel in the input image based on the detected plane regions; and acquiring plane weight information of the each pixel in a four-channel image including the input image and a two-dimensional single-channel image including the region information, based on the shortest distance on the two-dimensional single-channel image between the each pixel and the boundaries of the detected each plane region; determining similarity between the pixels based on pixel values, the region information and the plane weight information corresponding to the each pixel, and performing the image segmentation to obtain the refined plane region boundaries based on the similarity between the pixels.

Specifically, a digital label may be added to the each plane region as a number, and the image including a plane region number is as the fourth channel of the color image. The four-channel image is segmented, and the result of the segmentation is used to refine the boundaries of the plane regions. Through the above plane refinement operation, the detected planes may be aligned with the boundaries of the real objects.

The plane refinement based on the image segmentation will be specifically described below.

First, the discrete value label may be used to number the each plane region output by the plane segmentation module, and a two-dimensional single-channel image including the plane region number and a scene color image are combined to form the four-channel image. At this time, the value of each pixel of the four-channel is [R, G, B, P], where R is a red channel, G is a green channel, B is a blue channel, and P is a channel including a plane region label number. P value may reflect the region information corresponding to each pixel. Then, a plane weight map $W_{plane}$ is calculated using the two-dimensional single-channel image including the plane region number.

The weight value at each pixel in the weight map is proportional to the shortest distance on the two-dimensional single-channel image including the plane region number between the pixel and the boundaries of the plane regions. In this way, the plane weight information of the each pixel in the above four-channel image may be obtained based on the shortest distance on the two-dimensional single-channel image including the plane region number between the each pixel and the boundaries of the detected each plane region.

Finally, the image segmentation is performed based on a pixel similarity function by using an image segmentation algorithm (such as Efficient Graph-based image segmentation algorithm), to obtain the boundaries of the refined plane regions. The pixel similarity function is defined as follows:

$$\text{Diff}(pixel_1, pixel_2) = \frac{(1-w_1 * w_2)}{\sqrt{(r_1-r_2)^2+(g_1-g_2)^2+(b_1-b_2)^2+w_1*w_2*f(p_1,p_2)}} \quad \text{Equation 3}$$

wherein $pixel_1$, $pixel_2$ are two pixels whose similarity will be calculated, $r_1$, $g_1$, $b_1$, $p_1$ are the pixel values of $pixel_1$ in the four-channel image respectively, $r_2$, $g_2$, $b_2$, $p_2$ are the pixel values of $pixel_2$ in the four-channel image respectively, $w_1$, $w_2$ are the weight values of $pixel_1$, $pixel_2$ on the weight map $W_{plane}$ respectively, $f(p1, p2)$ is a plane distance function or a plane distance metric function.

Some embodiments of the plane detection method of the disclosure have been described above. Since the plane detection method proposed in the disclosure detects the planes based on the depth map of the whole input image, the planes may be detected in a texture-less region. In addition, on this basis, the accuracy of plane detection may be effectively improved by the feature map fusion module and/or the normal-guided attention module described above, and by further performing the plane refinement operation, the boundaries of the detected plane regions are aligned with the boundaries of the real objects in the input image.

Specially, in AR applications, it is often necessary to place virtual objects in a real scene, but there are many texture-less regions in the real scene (such as solid-colored walls, desktops, or the like). By using the plane detection method according to the disclosure, it is possible to support the detection of planes in the texture-less regions, so that a user may place the virtual objects in the texture-less regions, which meets the need of the user and improves user experience.

In addition, for example, in AR games, it is often necessary for virtual objects to interact with real objects. By using the plane detection method according to the disclosure, the plane detection result aligned with the boundaries of the real objects may be provided, thereby improving the accuracy of interaction of the virtual objects and the real objects, and improving game experience.

The plane detection method of the disclosure may be applied to AR glasses, smart phones or other AR terminals. In addition, it may be applied to applications such as navigations, exhibitions, trainings, games, and the like.

Figure 15:
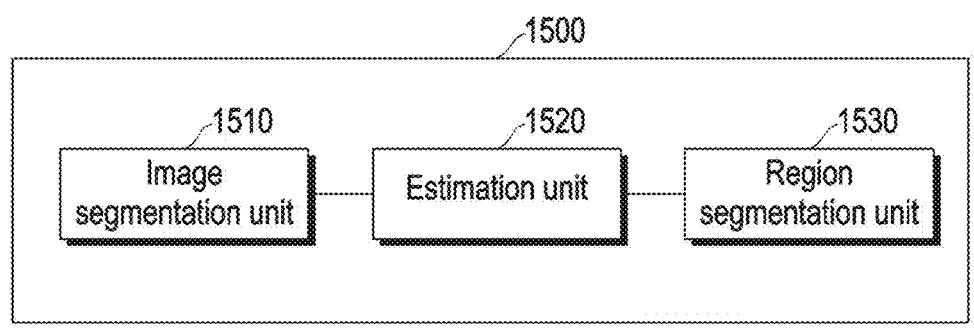
FIG. 15 is a block diagram illustrating a device for performing plane detection according to an embodiment of the disclosure.

FIG. 15 is a block diagram illustrating a device for performing plane detection according to an embodiment of the disclosure (hereinafter, for convenience of description, it is referred to as "a plane detection device").

Referring to FIG. 15, a plane detection device 1500 may include an image acquisition unit 1510, an estimation unit 1520, and a region segmentation unit 1530. Specifically, the image acquisition unit 1510 may be configured to acquire an input image. The estimation unit 1520 may be configured to extract features of the input image using a deep neural network and estimate a depth map of the input image based on the extracted features. The region segmentation unit 1530 may be configured to perform region segmentation to detect plane regions in the input image using the depth map. Specifically, for example, the region segmentation unit 1530 may use the depth map to calculate three-dimensional points and depth-continuous regions in the input image for plane estimation, and uses the calculated three-dimensional points and information of the depth-continuous regions to perform the region segmentation to detect the plane regions in the input image.

Alternatively, the plane detection device 1500 may further include a plane boundary refinement unit (not shown), and the plane boundary refinement unit may refine boundaries of the detected plane regions so that the boundaries of the plane regions are aligned with the boundaries of real objects in the input image.

Since the content or details involved in the above operations in describing the plane detection method according to the disclosure have been described above, it will not be repeated here for the sake of brevity. The corresponding content or details may refer to the description about FIGS. 3 to 14.

The plane detection method and the plane detection device according to the embodiments of the disclosure have been described above with reference to FIGS. 1 to 15. However, it should be understood that each unit in the device shown in FIG. 15 may be configured as software, hardware, firmware, or any combination of the above items that performs a specific function respectively. For example, these units may correspond to a dedicated integrated circuit, may also correspond to a pure software code, and may also correspond to a module combining the software and the hardware. As an example, the device described with reference to FIG. 15 may be a PC computer, a tablet device, a personal digital assistant, a smart phone, a web application, or other devices capable of executing program instructions, but is not limited thereto.

It should be noted that although the plane detection device 1500 is divided into units for performing a corresponding processing in describing the plane detection device 1500 above, it is clear to those skilled in the art that the processing performed by each unit may also be performed in the case that the plane detection device does not carry out any division of the specific units or there is no clear demarcation between the units.

In addition, the device described above with reference to FIG. 15 is not limited to including the units described above, but some other units (for example, a storage unit, a data processing unit, or the like) may be added as needed, or the above units may also be combined.

Figure 16:
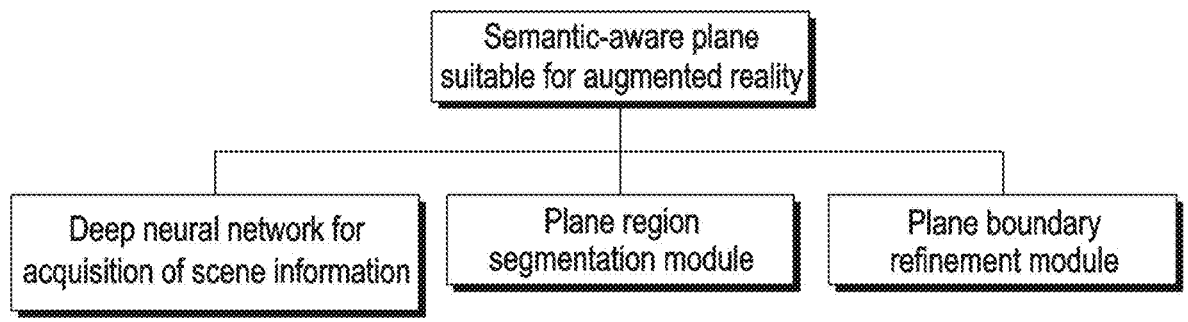
FIG. 16 is a schematic diagram illustrating a semantic-aware plane detection system suitable for augmented reality according to an embodiment of the disclosure.

FIG. 16 is a schematic diagram illustrating a semantic-aware plane detection system suitable for augmented reality according to an embodiment of the disclosure.

Referring to FIG. 16, the semantic-aware plane detection system suitable for augmented reality proposed by the disclosure contains three parts.

The first part is a deep neural network for scene information acquisition, the second part is a plane region segmentation module, and the third part is a plane boundary refinement module.

In the first implementation scheme, the deep neural network is used to estimate the depth information and the normal information. A normal-guided attention module is designed in the network structure of this module, which uses the high-frequency information in the normal feature map to make the estimated depth map sharper at the boundaries, so it may provide a more accurate dense three-dimensional point cloud for the plane detection; the plane region segmentation module performs clustering and segmentation on the dense three-dimensional point cloud containing the normal information, thereby obtaining a more accurate and robust plane region; the plane boundary refinement module uses the edge-preserving optimization algorithm to refine the obtained plane regions to align with the boundaries of the real objects, thereby obtaining a semantic-aware plane.

In the second implementation scheme, first, the input image is input into the depth estimation network to obtain the depth information of the whole image, then the obtained depth map is input into the plane region segmentation module to obtain the result of the plane region segmentation, and finally the boundaries of the plane regions are better aligned with the boundaries of the real objects by using the plane refinement method based on the image segmentation, wherein the deep estimation network may provide enough information for the subsequent plane region segmentation module, so that it may calculate the plane regions on the whole image including the texture-less region, wherein the plane region segmentation module works together with the subsequent plane refinement module based on the image segmentation to make the boundaries of the detected plane regions better aligned with the boundaries of the real objects of the scene, and the plane refinement algorithm is more efficient.

In addition, the plane detection method according to the disclosure may be recorded in a computer-readable recording medium. Specifically, according to the disclosure, it is possible to provide the computer-readable recording medium recording program instructions, which when executed by a processor, may cause the processor to execute the plane detection method as described above. Examples of the computer-readable recording media may include a magnetic media (for example, a hard disk, a floppy disk, and a magnetic tape), an optical media (for example, a compact disc read-only memory (CD-ROM) and a digital video disc (DVD)), a magneto-optical media (for example, an optical disk), and a hardware device (for example, read only memory (ROM), random access memory (RAM), flash memory, or the like) specially configured to store and execute the program instructions. In addition, according to the disclosure, an electronic device including a processor and a memory storing program instructions may also be provided, wherein the program instructions, when executed by the processor, cause the processor to execute the plane detection method as described above. Examples of the program instructions include, for example, a machine code generated by a compiler and a file containing a high-level code that may be executed by a computer using an interpreter.

In addition, some operations in the plane detection method according to the embodiment of the application may be implemented by a software manner, some operations may be implemented by a hardware manner, and in addition, these operations may also be implemented by a combination of the software and the hardware.

In addition, the disclosure also provides an electronic apparatus including a processor and a memory storing program instructions, wherein the program instructions, when executed by the processor, cause the processor to execute the plane detection method of the disclosure. As an example, the electronic apparatus may be a PC computer, a tablet device, a personal digital assistant, a smart phone, or other devices capable of executing the above set of instructions. Here, the electronic apparatus does not have to be a single electronic apparatus, and may also be an aggregation of devices or circuits that may execute the above instructions (or the set of the instructions) individually or jointly. The electronic apparatus may also be a part of an integrated control system or a system manager, or may be configured as a portable electronic apparatus interconnected with local or remote (e.g., via wireless transmission) by an interface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing plane detection, the method comprising:
acquiring an input image;

extracting features of the input image and estimating a depth map of the input image based on the extracted features, using a deep neural network;

calculating three-dimensional points and depth-continuous regions in the input image for plane estimation using the depth map; and performing region segmentation using the calculated three-dimensional points and information of the depth-continuous regions to detect plane regions in the input image.

2. The method of claim 1, wherein the deep neural network comprises:
a feature extractor configured to extract the features of the input image,
a depth estimation branch configured to estimate depth information of the input image, and
a normal estimation branch configured to estimate normal information of the input image, and wherein, in estimating the depth map of the input image, the depth information estimated by the depth estimation branch is optimized using the normal information estimated by the normal estimation branch.

3. The method of claim 2, wherein, in estimating the depth map of the input image, a feature map of predetermined resolution obtained by feature extraction of the input image using the feature extractor is fused with a depth feature map of the same resolution generated in depth estimation using the depth estimation branch and a normal feature map of the same resolution generated in normal estimation using the normal estimation branch, respectively, to obtain the depth map using the fused depth feature map and the fused normal feature map.

4. The method of claim 3, wherein the optimizing of the depth information estimated by the depth estimation branch using the normal information estimated by the normal estimation branch comprises:
extracting information related to a region in the normal feature map where normal feature change exceeds a predetermined degree; and
optimizing the depth feature map using the information to obtain the optimized depth feature map.

5. The method of claim 4, wherein the extracting of the information related to the region in the normal feature map where the normal feature change exceeds the predetermined degree and the optimizing of the depth feature map using the information comprises:
performing horizontal depth convolution and vertical depth convolution on the normal feature map, respectively;
obtaining a horizontal attention map and a vertical attention map for the information using an activation function; and
obtaining the optimized depth feature map based on the horizontal attention map, the vertical attention map and the depth feature map.

6. The method of claim 5, wherein the obtaining of the optimized depth feature map based on the horizontal attention map, the vertical attention map, and the depth feature map comprises:
weighting the horizontal attention map and the vertical attention map; and
fusing the weighted horizontal attention map and the weighted vertical attention map with the depth feature map to obtain the optimized depth feature map.

7. The method of claim 1, wherein the performing of the region segmentation using the calculated three-dimensional points and the information of the depth-continuous regions to detect the plane regions in the input image comprises:
calculating a normal map of the input image using the calculated three-dimensional points;
fusing the calculated normal map with a normal map estimated by the deep neural network; and
clustering using the fused normal map and the information of the depth-continuous regions to segment out the plane regions.

8. The method of claim 1, wherein the performing of the region segmentation using the calculated three-dimensional points and the information of the depth-continuous regions to detect the plane regions in the input image comprises:
calculating a normal map of the input image using the calculated three-dimensional points; and
clustering using the calculated normal map and the information of the depth-continuous regions to segment out the plane regions.

9. The method of claim 8,
wherein the deep neural network comprises a feature extractor configured to extract features of the input image, and a depth estimation branch configured to estimate depth information of the input image, and
wherein, in estimating the depth map of the input image, a feature map of predetermined resolution obtained by feature extraction of the input image using the feature extractor is fused with a depth feature map of the same resolution generated in depth estimation using the depth estimation branch, to generate the depth map using the fused depth feature map.

10. The method of claim 1, further comprising:
refining boundaries of the detected plane regions so that the boundaries of the plane regions are aligned with boundaries of real objects in the input image.

11. The method of claim 10, wherein the refining of the boundaries of the detected plane regions comprises:
acquiring a discrete label value corresponding to the detected each plane region, respectively;
converting the detected each plane region into a three-dimensional volume based on the discrete label value; and
refining the plane regions based on the converted three-dimensional volume and the input image, so that the boundaries of the plane regions are aligned with the boundaries of the real objects in the input image.

12. The method of claim 10, wherein the refining of the boundaries of the detected plane regions comprises:
acquiring region information corresponding to each pixel in the input image based on the detected each plane region;
acquiring plane weight information of the each pixel in a four-channel image including the input image and a two-dimensional single-channel image including the region information, based on the shortest distance on the two-dimensional single-channel image between the each pixel and the boundaries of the detected each plane region;
determining similarity between pixels based on a pixel value, the region information and the plane weight information corresponding to the each pixel; and
performing image segmentation based on the similarity between the each pixel to obtain the refined plane region boundaries.

13. A device for performing plane detection, the device comprising:
an image acquisition unit configured to acquire an input image;

an estimation unit configured to extract features of the input image and estimate a depth map of the input image based on the extracted features using a deep neural network; and a region segmentation unit configured to:
- calculate three-dimensional points and depth-continuous regions in the input image for plane estimation using the depth map, and
- perform region segmentation using the calculated three-dimensional points and information of the depth-continuous regions to detect plane regions in the input image.

14. One or more non-transitory computer readable storage media storing computer-executable instructions that, when executed by at least one processor of an electronic device, cause the electronic device to perform operations comprising:

acquiring an input image;

extracting features of the input image and estimating a depth map of the input image based on the extracted features, using a deep neural network;

calculating three-dimensional points and depth-continuous regions in the input image for plane estimation using the depth map; and performing region segmentation using the calculated three-dimensional points and information of the depth-continuous regions to detect plane regions in the input image.

15. The one or more non-transitory computer-readable storage media of claim 14,
wherein the deep neural network comprises:
- a feature extractor configured to extract the features of the input image,
- a depth estimation branch configured to estimate depth information of the input image, and
- a normal estimation branch configured to estimate normal information of the input image, and wherein, in estimating the depth map of the input image, the depth information estimated by the depth estimation branch is optimized using the normal information estimated by the normal estimation branch.

16. The one or more non-transitory computer-readable storage media of claim 15, wherein, in estimating the depth map of the input image, a feature map of predetermined resolution obtained by feature extraction of the input image using the feature extractor is fused with a depth feature map of the same resolution generated in depth estimation using the depth estimation branch and a normal feature map of the same resolution generated in normal estimation using the normal estimation branch, respectively, to obtain the depth map using the fused depth feature map and the fused normal feature map.

17. The one or more non-transitory computer-readable storage media of claim 16, wherein the optimizing of the depth information estimated by the depth estimation branch using the normal information estimated by the normal estimation branch comprises:
- extracting information related to a region in the normal feature map where normal feature change exceeds a predetermined degree; and
- optimizing the depth feature map using the information to obtain the optimized depth feature map.

18. The one or more non-transitory computer-readable storage media of claim 17, wherein the extracting of the information related to the region in the normal feature map where the normal feature change exceeds the predetermined degree and the optimizing of the depth feature map using the information comprises:
- performing horizontal depth convolution and vertical depth convolution on the normal feature map, respectively;
- obtaining a horizontal attention map and a vertical attention map for the information using an activation function; and
- obtaining the optimized depth feature map based on the horizontal attention map, the vertical attention map and the depth feature map.

19. The one or more non-transitory computer-readable storage media of claim 18, wherein the obtaining of the optimized depth feature map based on the horizontal attention map, the vertical attention map, and the depth feature map comprises:
- weighting the horizontal attention map and the vertical attention map; and
- fusing the weighted horizontal attention map and the weighted vertical attention map with the depth feature map to obtain the optimized depth feature map.

* * * * *